(12) United States Patent
Cummings et al.

(10) Patent No.: US 7,417,735 B2
(45) Date of Patent: Aug. 26, 2008

(54) SYSTEMS AND METHODS FOR MEASURING COLOR AND CONTRAST IN SPECULAR REFLECTIVE DEVICES

(75) Inventors: William Cummings, Millbrae, CA (US); Brian Gally, Los Gatos, CA (US)

(73) Assignee: IDC, LLC, Pleasanton, CA (US)

( * ) Notice: Subject to any disclaimer, the term of this patent is extended or adjusted under 35 U.S.C. 154(b) by 232 days.

(21) Appl. No.: 11/198,603

(22) Filed: Aug. 5, 2005

(65) Prior Publication Data

US 2006/0066856 A1 Mar. 30, 2006

Related U.S. Application Data

(60) Provisional application No. 60/613,537, filed on Sep. 27, 2004.

(51) Int. Cl.
*G01N 21/27* (2006.01)
*G01J 3/50* (2006.01)
*G01J 1/16* (2006.01)
*G02B 26/02* (2006.01)
*G02F 1/21* (2006.01)

(52) U.S. Cl. .................. 356/408; 356/405; 356/406; 356/422; 356/425; 356/243.5; 369/291; 369/295; 348/755

(58) Field of Classification Search .................. 356/328, 356/402, 408, 305, 243.5; 359/290, 291, 359/295; 348/755
See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,813,265 A | 5/1974 | Marks | |
| 3,899,295 A | 8/1975 | Halpern et al. | |

(Continued)

FOREIGN PATENT DOCUMENTS

CH 6855887 10/1995

(Continued)

OTHER PUBLICATIONS

"The Reflection/backscattering Probes", retrieved from the Internet: URL: http://web.archive.org/web/20011225001534/oceanoptics.com/products/reflectionprobes.asp [retrieved on Dec. 25, 2001].*

(Continued)

*Primary Examiner*—Gregory J. Toatley, Jr.
*Assistant Examiner*—Bryan Giglio
(74) *Attorney, Agent, or Firm*—Knobbe, Martens, Olson & Bear LLP

(57) ABSTRACT

Disclosed herein are systems and methods for measuring color and contrast in specular reflective devices such as interferometric modulators. To make color and contrast determinations, light reflected from a specular reflective device may be measured in-line with illumination of the device. The measurements may include measuring the spectra of light reflected from the device being tested as well as from specular bright and dark standards. The spectra may be used to determine a reflectance spectrum and color parameters for the specular reflective device.

43 Claims, 12 Drawing Sheets

U.S. PATENT DOCUMENTS

| | | |
|---|---|---|
| 3,955,880 A | 5/1976 | Lierke |
| 4,001,808 A | 1/1977 | Ebihara et al. |
| 4,099,854 A | 7/1978 | Decker et al. |
| 4,224,565 A | 9/1980 | Sosniak et al. |
| 4,228,437 A | 10/1980 | Shelton |
| 4,377,324 A | 3/1983 | Durand et al. |
| 4,389,096 A | 6/1983 | Hori et al. |
| 4,403,248 A | 9/1983 | te Velde |
| 4,441,791 A | 4/1984 | Hornbeck |
| 4,445,050 A | 4/1984 | Marks |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,897,360 A | 1/1990 | Guckel et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A * | 8/1992 | Koehler ............ 359/578 |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,175,772 A | 12/1992 | Kahn et al. |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,296,950 A | 3/1994 | Lin et al. |
| 5,305,640 A | 4/1994 | Boysel et al. |
| 5,307,139 A | 4/1994 | Tyson, II et al. |
| 5,311,360 A | 5/1994 | Bloom et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,409 A | 10/1995 | Henley et al. |
| 5,459,602 A | 10/1995 | Sampsell |
| 5,459,610 A | 10/1995 | Bloom et al. |
| 5,461,411 A | 10/1995 | Florence et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoades et al. |
| 5,619,366 A | 4/1997 | Rhoads et al. |
| 5,636,052 A | 6/1997 | Arney et al. |
| 5,646,768 A | 7/1997 | Kaeiyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,703,710 A | 12/1997 | Brinkman et al. |
| 5,710,656 A | 1/1998 | Goosen |
| 5,729,245 A | 3/1998 | Gove et al. |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,784,190 A | 7/1998 | Worley |
| 5,784,212 A | 7/1998 | Hornbeck |

| | | | | | | |
|---|---|---|---|---|---|---|
| 5,818,095 | A | 10/1998 | Sampsell | 6,862,029 B1 | 3/2005 | D'Souza et al. |
| 5,825,528 | A | 10/1998 | Goosen | 6,867,896 B2 | 3/2005 | Miles |
| 5,835,255 | A | 11/1998 | Miles | 6,870,581 B2 | 3/2005 | Li et al. |
| 5,842,088 | A | 11/1998 | Thompson | 6,870,654 B2 | 3/2005 | Lin et al. |
| 5,912,758 | A | 6/1999 | Knipe et al. | 6,882,458 B2 | 4/2005 | Lin et al. |
| 5,986,796 | A | 11/1999 | Miles | 6,882,461 B1 | 4/2005 | Tsai et al. |
| 6,028,690 | A | 2/2000 | Carter et al. | 6,912,022 B2 | 6/2005 | Lin et al. |
| 6,038,056 | A | 3/2000 | Florence et al. | 6,952,303 B2 | 10/2005 | Lin et al. |
| 6,040,937 | A | 3/2000 | Miles | 6,958,847 B2 | 10/2005 | Lin |
| 6,049,317 | A | 4/2000 | Thompson et al. | 6,965,477 B2 * | 11/2005 | Someno et al. ............. 359/579 |
| 6,055,090 | A | 4/2000 | Miles | 6,982,178 B2 * | 1/2006 | LeCain et al. ................. 438/22 |
| 6,061,075 | A | 5/2000 | Nelson et al. | 7,106,514 B2 * | 9/2006 | Murata et al. ............... 359/578 |
| 6,088,474 | A | 7/2000 | Dudasko et al. | 7,123,216 B1 | 10/2006 | Miles |
| 6,099,132 | A | 8/2000 | Kaeriyama | 7,187,489 B2 | 3/2007 | Miles |
| 6,113,239 | A | 9/2000 | Sampsell et al. | 7,259,865 B2 * | 8/2007 | Cummings et al. .......... 356/503 |
| 6,147,790 | A | 11/2000 | Meier et al. | 7,265,429 B2 * | 9/2007 | Wan .......................... 257/415 |
| 6,160,833 | A | 12/2000 | Floyd et al. | 7,265,477 B2 * | 9/2007 | Wan .......................... 310/309 |
| 6,180,428 | B1 | 1/2001 | Peeters et al. | 2001/0003487 A1 | 6/2001 | Miles |
| 6,201,633 | B1 | 3/2001 | Peeters et al. | 2002/0015215 A1 | 2/2002 | Miles |
| 6,232,936 | B1 | 5/2001 | Gove et al. | 2002/0054424 A1 | 5/2002 | Miles |
| 6,282,010 | B1 | 8/2001 | Sulzbach et al. | 2002/0075555 A1 | 6/2002 | Miles |
| 6,285,207 | B1 | 9/2001 | Listwan | 2002/0126364 A1 | 9/2002 | Miles |
| 6,295,154 | B1 | 9/2001 | Laor et al. | 2002/0157033 A1 | 10/2002 | Cox |
| 6,323,982 | B1 | 11/2001 | Hornbeck | 2003/0016361 A1 | 1/2003 | Mank et al. |
| 6,347,009 | B1 | 2/2002 | Takeuchi | 2003/0043157 A1 | 3/2003 | Miles |
| 6,407,560 | B1 | 6/2002 | Walraven et al. | 2003/0063081 A1 | 4/2003 | Kimura et al. |
| RE37,847 | E | 9/2002 | Henley et al. | 2003/0072070 A1 | 4/2003 | Miles |
| 6,447,126 | B1 | 9/2002 | Hornbeck | 2003/0077881 A1 | 4/2003 | Gelmi et al. |
| 6,465,355 | B1 | 10/2002 | Horsley | 2003/0112231 A1 | 6/2003 | Kurumisawa |
| 6,466,358 | B2 | 10/2002 | Tew | 2003/0202264 A1 | 10/2003 | Weber et al. |
| 6,473,274 | B1 | 10/2002 | Maimone et al. | 2003/0202265 A1 | 10/2003 | Reboa et al. |
| 6,480,177 | B2 | 11/2002 | Doherty et al. | 2003/0202266 A1 | 10/2003 | Ring et al. |
| 6,496,122 | B2 | 12/2002 | Sampsell | 2004/0004610 A1 | 1/2004 | Iwami et al. |
| 6,545,335 | B1 | 4/2003 | Chua et al. | 2004/0027636 A1 | 2/2004 | Miles |
| 6,548,908 | B2 | 4/2003 | Chua et al. | 2004/0051929 A1 | 3/2004 | Sampsell et al. |
| 6,549,338 | B1 | 4/2003 | Wolverton et al. | 2004/0057043 A1 | 3/2004 | Newman et al. |
| 6,552,840 | B2 | 4/2003 | Knipe | 2004/0058532 A1 | 3/2004 | Miles et al. |
| 6,567,715 | B1 | 5/2003 | Sinclair et al. | 2004/0070400 A1 | 4/2004 | van Spengen |
| 6,574,033 | B1 | 6/2003 | Chui et al. | 2004/0080807 A1 | 4/2004 | Chen et al. |
| 6,589,625 | B1 | 7/2003 | Kothari et al. | 2004/0125281 A1 | 7/2004 | Lin et al. |
| 6,600,201 | B2 | 7/2003 | Hartwell et al. | 2004/0145049 A1 | 7/2004 | McKinnell et al. |
| 6,606,175 | B1 | 8/2003 | Sampsell et al. | 2004/0145811 A1 | 7/2004 | Lin et al. |
| 6,625,047 | B2 | 9/2003 | Coleman, Jr. | 2004/0147056 A1 | 7/2004 | McKinnell et al. |
| 6,630,786 | B2 | 10/2003 | Cummings et al. | 2004/0147198 A1 | 7/2004 | Lin et al. |
| 6,632,698 | B2 | 10/2003 | Ives | 2004/0160143 A1 | 8/2004 | Shreeve et al. |
| 6,643,069 | B2 | 11/2003 | Dewald | 2004/0174583 A1 | 9/2004 | Chen et al. |
| 6,650,455 | B2 | 11/2003 | Miles | 2004/0175577 A1 | 9/2004 | Lin et al. |
| 6,666,561 | B1 | 12/2003 | Blakley | 2004/0179281 A1 | 9/2004 | Reboa |
| 6,674,090 | B1 | 1/2004 | Chua et al. | 2004/0206953 A1 | 10/2004 | Morena et al. |
| 6,674,562 | B1 | 1/2004 | Miles | 2004/0207836 A1 * | 10/2004 | Chhibber et al. ......... 356/237.4 |
| 6,680,792 | B2 | 1/2004 | Miles | 2004/0207897 A1 | 10/2004 | Lin |
| 6,710,908 | B2 | 3/2004 | Miles et al. | 2004/0209192 A1 | 10/2004 | Lin et al. |
| 6,711,283 | B1 * | 3/2004 | Soenksen .................... 382/133 | 2004/0209195 A1 | 10/2004 | Lin |
| 6,741,377 | B2 | 5/2004 | Miles | 2004/0212026 A1 | 10/2004 | Van Brocklin et al. |
| 6,741,384 | B1 | 5/2004 | Martin et al. | 2004/0217378 A1 | 11/2004 | Martin et al. |
| 6,741,503 | B1 | 5/2004 | Farris et al. | 2004/0217919 A1 | 11/2004 | Pichl et al. |
| 6,747,785 | B2 | 6/2004 | Chen et al. | 2004/0218251 A1 | 11/2004 | Piehl et al. |
| 6,747,800 | B1 | 6/2004 | Lin | 2004/0218334 A1 | 11/2004 | Martin et al. |
| 6,750,152 | B1 | 6/2004 | Christenson et al. | 2004/0218341 A1 | 11/2004 | Martin et al. |
| 6,753,528 | B1 | 6/2004 | Nikoonahad et al. | 2004/0227493 A1 | 11/2004 | Van Brocklin et al. |
| 6,775,174 | B2 | 8/2004 | Huffman et al. | 2004/0240032 A1 | 12/2004 | Miles |
| 6,778,155 | B2 | 8/2004 | Doherty et al. | 2004/0240138 A1 | 12/2004 | Martin et al. |
| 6,794,119 | B2 | 9/2004 | Miles | 2004/0245588 A1 | 12/2004 | Nikkel et al. |
| 6,811,267 | B1 | 11/2004 | Allen et al. | 2004/0263944 A1 | 12/2004 | Miles et al. |
| 6,819,469 | B1 | 11/2004 | Koba | 2005/0001828 A1 | 1/2005 | Martin et al. |
| 6,822,628 | B2 | 11/2004 | Dunphy et al. | 2005/0003667 A1 | 1/2005 | Lin et al. |
| 6,824,739 | B1 | 11/2004 | Arney et al. | 2005/0024557 A1 | 2/2005 | Lin |
| 6,829,132 | B2 | 12/2004 | Martin et al. | 2005/0035699 A1 | 2/2005 | Tsai |
| 6,853,129 | B1 | 2/2005 | Cummings et al. | 2005/0036095 A1 | 2/2005 | Yeh et al. |
| 6,855,610 | B2 | 2/2005 | Tung et al. | 2005/0036192 A1 | 2/2005 | Lin et al. |
| 6,859,218 | B1 | 2/2005 | Luman et al. | 2005/0038950 A1 | 2/2005 | Adelmann |
| 6,861,277 | B1 | 3/2005 | Monroe et al. | 2005/0042117 A1 | 2/2005 | Lin |
| 6,862,022 | B2 | 3/2005 | Slupe | 2005/0042777 A1 * | 2/2005 | Boger et al. .................... 438/8 |

| | | | |
|---|---|---|---|
| 2005/0046922 A1 | 3/2005 | Lin et al. | |
| 2005/0046948 A1 | 3/2005 | Lin | |
| 2005/0057442 A1 | 3/2005 | Way | |
| 2005/0068583 A1 | 3/2005 | Gutkowski et al. | |
| 2005/0068605 A1 | 3/2005 | Tsai | |
| 2005/0068606 A1 | 3/2005 | Tsai | |
| 2005/0069209 A1 | 3/2005 | Damera-Venkata et al. | |
| 2005/0078348 A1 | 4/2005 | Lin | |
| 2005/0168849 A1 | 8/2005 | Lin | |
| 2005/0195462 A1 | 9/2005 | Lin | |
| 2005/0202649 A1 | 9/2005 | Hung et al. | |
| 2005/0249966 A1 | 11/2005 | Tung et al. | |
| 2006/0066864 A1* | 3/2006 | Cummings et al. | 356/450 |
| 2006/0066872 A1* | 3/2006 | Cummings et al. | 356/504 |
| 2006/0066935 A1 | 3/2006 | Cummings et al. | |
| 2006/0077381 A1* | 4/2006 | Cummings et al. | 356/237.6 |
| 2006/0176487 A1* | 8/2006 | Cummings et al. | 356/445 |
| 2007/0097134 A1 | 5/2007 | Miles | |
| 2008/0002206 A1* | 1/2008 | Cummings et al. | 356/445 |
| 2008/0003352 A1* | 1/2008 | Cummings et al. | 427/99.2 |

FOREIGN PATENT DOCUMENTS

| | | |
|---|---|---|
| DE | 19525081 | 1/1997 |
| EP | 1065645 | 1/2001 |
| FR | 2516785 | 5/1983 |
| GB | 2030721 | 4/1980 |
| JP | 01259243 | 10/1989 |
| JP | 01259243 | 1/1990 |
| JP | 3002540 A | 1/1991 |
| JP | 11 337412 | 3/2000 |
| WO | WO 95/30924 | 11/1995 |
| WO | WO 97/17628 | 5/1997 |
| WO | WO 99/52006 A2 | 10/1999 |
| WO | WO 99/52006 A3 | 10/1999 |
| WO | WO 01/69310 A1 | 9/2001 |
| WO | WO 02/093116 A1 | 11/2002 |
| WO | WO 03/007049 A1 | 1/2003 |
| WO | WO 03/069413 A1 | 8/2003 |
| WO | WO 03/073151 A1 | 9/2003 |
| WO | WO 2004/006003 A1 | 1/2004 |
| WO | WO 2004/025239 A2 | 3/2004 |
| WO | WO 2004/026757 A2 | 4/2004 |
| WO | WO 2005/001410 A1 | 1/2005 |

OTHER PUBLICATIONS

Mile, M.W., "Interferometric Modulation: MOEMS as an Enabling Technology for High Performance Reflective Displays", Jan. 2003, Proc. of SPIE, vol. 4985, p. 131-139.*

Miles, M.W., "MEMS-based Interferometric modulator for display applications", Sep. 1999, Proc. SPIE, vol. 3876, p. 20-28.*

Sharma and Trussell, "Digital Color Imaging", 1997, IEEE Transactions on Image Processing, vol. 6, No. 7, p. 901-932.*

Ocean Optics, "High-Reflectivity Specular Reflectance Standard", retrieved from the Internet: URL:http://web.archive.org/web/20030616003610/oceanoptics.com/products/stan-ssh.asp [retrieved on Jun. 16, 2003].*

Ocean Optics, "Low-reflectivity Specular Reflectance Standard", retrieved from the Internet: URL:http://web.archive.org/web/20030614185739/oceanoptics.com/products/stan-ssl.asp [retrieved on Jun. 14, 2003].*

Akasaka, "Three-Dimensional IC Trends," Proceedings of IEEE, vol. 74, No. 12, pp. 1703-1714 (Dec. 1986).

Aratani et al., "Process and Design Considerations for Surface Micromachine d Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Conner, "Hybrid Color Display Using Optical Interference Filter Array," SID Digest, pp. 577-580 (1993).

Durr et al., "Reliability Test and Failure Analysis of Optical MEMS", Proceedings of the 9th International Symposium on the Physical and Failure Analysis of Integrated Circuits, pp. 201-206, (Jul. 8-12, 2002).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).

Gosch, "West Germany Grabs the Lead in X-Ray Lithography," Electronics, pp. 78-80 (Feb. 5, 1987).

Harpster Timothy J et al., "A Passive Humidity Monitoring System for In Situ Remote Wireless Testing of Micropackages," J Microelectromech Syst. vol. 11, No. 1, p. 61-67, (2002).

Howard et al., "Nanometer-Scale Fabrication Techniques," VLSI Electronics: Microstructure Science, vol. 5, pp. 145-153 and pp. 166-173 (1982).

Jackson, "Classical Electrodynamics," John Wiley & Sons Inc., pp. 568-573, date unknown.

Johnson "Optical Scanners," Microwave Scanning Antennas, vol. 1, pp. 251-261 (1964).

Light over Matter, Circle No. 36 (Jun. 1993).

Miles, "A New Reflective FPD Technology Using Interferometric Modulation," Society for Information Display '97 Digest, Session 7.3.

Miles, "Interferometric Modulation:MOEMS as an Enabling Technology for High-Performance Reflective Display," Proceedings of the SPIE, vol. 4985, p. 131-139. (2003).

Newsbreaks, "Quantum-trench devices might operate at terahertz frequencies," Laser Focus World (May 1993).

Oliner et al., "Radiating Elements and Mutual Coupling," Microwave Scanning Antennas, vol. 2, p. 131-194 (1966).

Raley et al., "A Fabry-Perot Microinterferometer for Visible Wavelengths," IEEE Solid-State Sensor and Actuator Workshop, Hilton Head, SC (1992).

"Reflection/backscattering Probes," Ocean Optics, INC, Internet Article, p. 1-3, XP-002358482. URL:http://web.archive.org/web/20040619022333/www.oceanoptics.com/products/reflectionprobes.asp> retrieved on Jun. 19, 2004.

Roveti, "Choosing a Humidity Sensor: A Review of Three Technologies", http://www.sensormag.com/articles/0701/54/main.shtml, (published prior to Sep. 17, 2004).

Skagga et al, "Automatic Testing of the Digital Micromirror Device", IEEE/LEOS 1996 Summer Topical Meetings, pp. 11-12, (Aug. 5-9, 1996).

Sperger et al., "High Performance Patterned All-Dielectric Interference Colour Filter for Display Applications," SID Digest, pp. 81-83 (1994).

Stone, "Radiation and Optics, An Introduction to the Classical Theory," McGraw-Hill, pp. 340-343 (1963).

Tabata et al., "In Situ Observation and Analysis of Wet Etching Process for Micro Electro-mechanical systems," Proc. of the Workshop on Micro Electro Mechanical Systems. vol. Workshop 4. p. 99-102, (1991).

Walker, et al., "Electron-beam-tunable Interference Filter Spatial Light Modulator," Optics Letters vol. 13, No. 5, pp. 345-347 (May 1988).

Waelti M. et al., "Package Quality Testing Using Integrated Pressure Sensor," Proc. of the SPIE, vol. 3582, p. 981-986, (1998).

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

International Search Report PCT Application No. PCT/US2005/030378, Dated Aug. 25, 2005.

"Low-reflectivity Specular Reflectance Standard", Ocean Optics, INC. Internet Article, XP-002374848. URL:http://web.archive.org/web/20040220134257/www.oceanoptics.com/products/stan-ssh.asp> retrieved on Feb. 20, 2004.

"S2000 Miniature Fiber Optic Spectrometer", Ocean Optics, INC, Internet Article, p. 1-2. XP-002358483. URL:http://web.archive.org/web/20040617035842/www.oceanoptics/products/s2000.asp> retrieved on Jun. 17, 2004.

International Search Report PCT Application No. PCT/US2005/030378, Dated Apr. 18, 2006.

Drieenhuizen, et al., "Comparison of Techniques for measuring Both Compressive and Tensile Stress in Thin Films." *Sensors and Actuators*, vol. 37-38, pp. 759-765. (1993).

Guckel et al., "Fine-Grained Polysilicon Films with Built-in Tensile Strain," *IEEE Transactions on Electron Devices*, vol. 35, No. 6, pp. 801-802, (1988).

"High-reflectivity Specular Reflectance standard," [Online] XP002374849, (URL:http://web.archive.org/web/20040220134330/www.oceanoptics.com/products/stan.ss1.asp> (retreived on Feb. 20, 2004.

Lin et al., "A Micro Strain Gauge with Mechanical Amplifier," *J. of Microelectromechanical Systems*, vol. 6, No. 4, (1997).

"Low-reflectivity Specular Reflectance Standard," Internet Article, XP002374848 <URL:http://web.archive.org/web/20040220134257/www.oceanoptics.com/Productsstan.ss1.asp> (retrieved on Feb. 20, 2004).

Pruessner et al., "Mechanical Property Measurement of InP-based MEMS for optical communications," *Sensors and Actuators*, vol. 105, pp. 190-200, (2003).

"S2000 Miniature Fiber Optic Spectrometer", Internet Article, XP002358483, pp. 1-2, <URL:http://web.archive.org/web/20040617035842/www.oceanoptics.com/products/s2000.asp> (Retrieved Jun. 17, 2004).

Singh et al., "Strain Studies in LPCVD Polysilicon for Surface Micromachined Devices," *Sensors and Actuators*, vol. 77, pp. 133-138, (1999).

Srikar et al., "A Critical Review of Microscale Mechanical Testing Methods Used in the Design of Microelectromechanical Systems," *Society for Experimental mechanics*, vol. 43, No. 3, (2003).

Zhang, et al., "Measurements of Residual Stresses in Thin Films Using Micro-Rotating-Structures." *Thin Solid Films*, vol. 335, pp. 97-105, (1998).

Dokmeci, et al. *"A High-Sensitivity Polyimide Capacitive Relative Humidity Sensor for Monitoring Anodically Bonded Hermetic Micropackages"* Journal of Microelectromechanical Systems, vol. 10, No. 2, Jun. 2001, 197-204.

Jin, et al. *"MEMS Vacuum Packaging Technology and Applications"* Electronics Packaging Technology, , 2003, 5$^{th}$ Conference, Dec. 10-12, 2003, Piscataway, NJ, pp. 301-306.

Tominette, et al, Moisture and Impurities Detection and removal in Packaged MEMS, proceeding of SPIE vol. 4558, (2001), pp. 215-225.

Jerman et al., "A Miniature Fabry-Perot Interferometer with a Corrugated Silicon Diaphragm Support," IEEE Electron Devices Society (1988).

Miles, "5.3: Digital Paper™: Reflective Displays Using Interferometric Modulation," SID 00 Digest, pp. 32-35 (2000).

Miles et al., "Digital Paper™0 for Reflective Displays," J. of the Society for Information Display Soc. Inf. Display USA. vol. 11, No. 1, p. 209-215. (2003).

IPRP for PCT/US05/030378 filed Aug. 25, 2005.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

ND METHODS FOR MEASURING
SYSTEMS AND METHODS FOR MEASURING COLOR AND CONTRAST IN SPECULAR REFLECTIVE DEVICES

CROSS-REFERENCE TO RELATED APPLICATIONS

This application claims priority to U.S. Provisional Application No. 60/613,537, filed on Sep. 27, 2004, which is incorporated herein by reference in its entirety.

BACKGROUND OF THE INVENTION

1. Field of the Invention

The field of the invention relates to microelectromechanical systems (MEMS).

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment disclosed herein includes a method of measuring color or contrast of a specular reflective device, including providing incident illumination on the device that is substantially perpendicular to a reflective surface of the device measuring a spectrum of only light reflected from the reflective surface that is substantially perpendicular to the reflective surface.

Another embodiment disclosed herein includes a method of measuring color or contrast of one or more sample interferometric modulators, including measuring a spectrum of light reflected from a bright standard, measuring a spectrum of light reflected from the one or more sample interferometric modulators, and determining a reflectance spectrum of the sample interferometric modulators based on the spectra of light reflected from the bright standard and one or more sample interferometric modulators.

Another embodiment disclosed herein includes an integrated reflective display element and test standard wafer, including a plurality of reflective display elements adapted for use in a display, a bright standard, wherein the reflective display elements and the bright standard are present on a single wafer.

Another embodiment disclosed herein includes a wafer that comprises a plurality of first means for reflecting light for use in a display and second means for reflecting light at an intensity greater than light reflected from the first means, wherein the first means and the second means are present on a single wafer.

Another embodiment disclosed herein includes an in-line lighting and measurement system that includes an illumination source adapted to illuminate a specularly reflective device, a detector adapted to detect light reflected from the specularly reflective device, and a specularly reflective bright standard adapted to specularly reflect light from the illumination source into the detector, thereby providing a reflectance spectrum standard for use in determining a reflectance spectrum of the specularly reflective device.

Another embodiment disclosed herein includes an in-line lighting and measurement system, including at least one detection fiber optic element adapted to receive input light from one end and operatively coupled to a detector on another end and a plurality of illumination fiber optic elements positioned peripherally around the at least one detection fiber optic element, the illumination fiber optic elements adapted to emit light from one end and operatively coupled to a light source at another end.

Another embodiment disclosed herein includes a method of determining whether an array of interferometric modulators are suitable for use as a display, including determining color parameters for at least some of the interferometric modulators in an un-driven state, a memory dark state, a memory bright state, and an over-driven state and identifying the array as suitable for use as a display based on the determining.

Another embodiment disclosed herein includes an integrated interferometric modulator and test standard wafer manufactured by a process that includes a plurality of material deposition steps, a plurality of patterning steps that define regions for material removal, and a plurality of material removal steps, wherein the patterning steps are used to define a plurality of interferometric modulators and separately at least one reflectivity standard selected from the group consisting of a bright standard and a dark standard.

A method of manufacturing an interferometric modulator array, including forming a plurality of interferometric modulators on a substantially transparent substrate and forming a reflectivity standard on the substrate, wherein the reflectivity standard is selected from the group consisting of a bright standard and a dark standard.

A method of measuring color of an interferometric modulator, including detecting light reflected from the interferometric modulator, determining a first reference reflectivity using a means for reflecting a maximum amount of light, and determining the color of the interferometric modulator from the detected light and first reference reflectivity.

An interferometric modulator display comprising a plurality of interferometric modulators identified as suitable for use in the display by detecting light reflected from at least some of the interferometric modulators, detecting light reflected from a bright standard, and determining a reflectance spectrum, one or more color parameters, and/or a contrast ratio of the interferometric modulators.

DETAILED DESCRIPTION OF THE CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Many display technologies inherently provide diffuse light to a viewer. In contrast, displays based on interferometric modulators inherently provide specular reflected light. While it may be desirable to incorporate a diffuser film in such displays, the specular nature of interferometric modulators presents unique challenges and opportunities for measuring the color and contrast produced by a given display. Accordingly, in various embodiments disclosed herein, systems and methods are provided for measuring color and contrast in specular reflective devices such as interferometric modulators. In one embodiment, color and contrast is measured by measuring spectra of light specularly reflected from the interferometric modulators. The spectra may be measured using in-line lighting systems that provide incident illumination that is substantially parallel to the detected reflected light. In some embodiments, spectra of light reflected from specular bright and dark standards are also measured and compared to the spectrum of light reflected from the interferometric modulators in order to obtain a reflectance spectrum and color parameters for the interferometric modulators.

Figure 1:
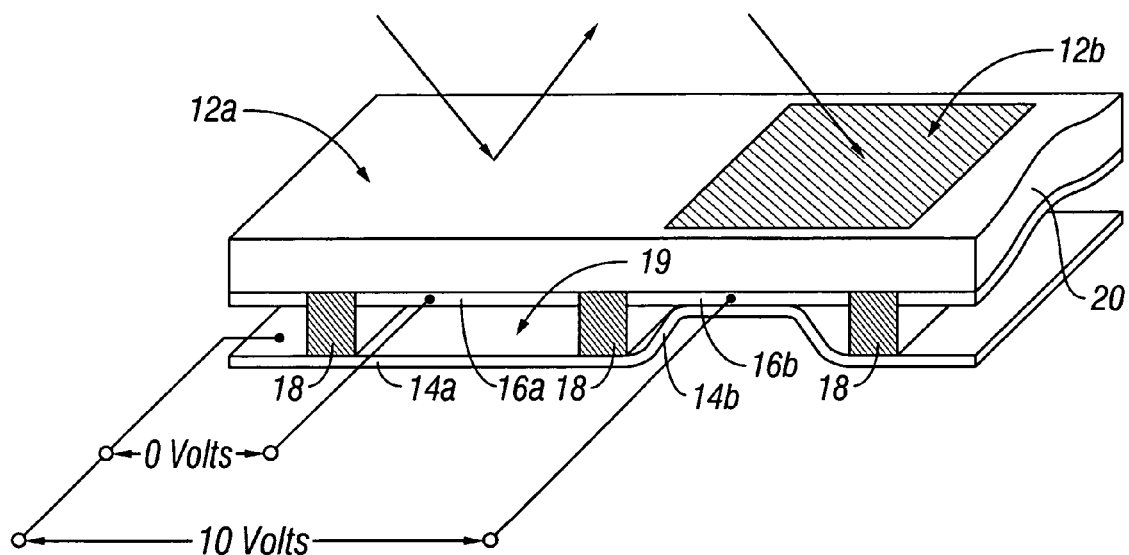
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
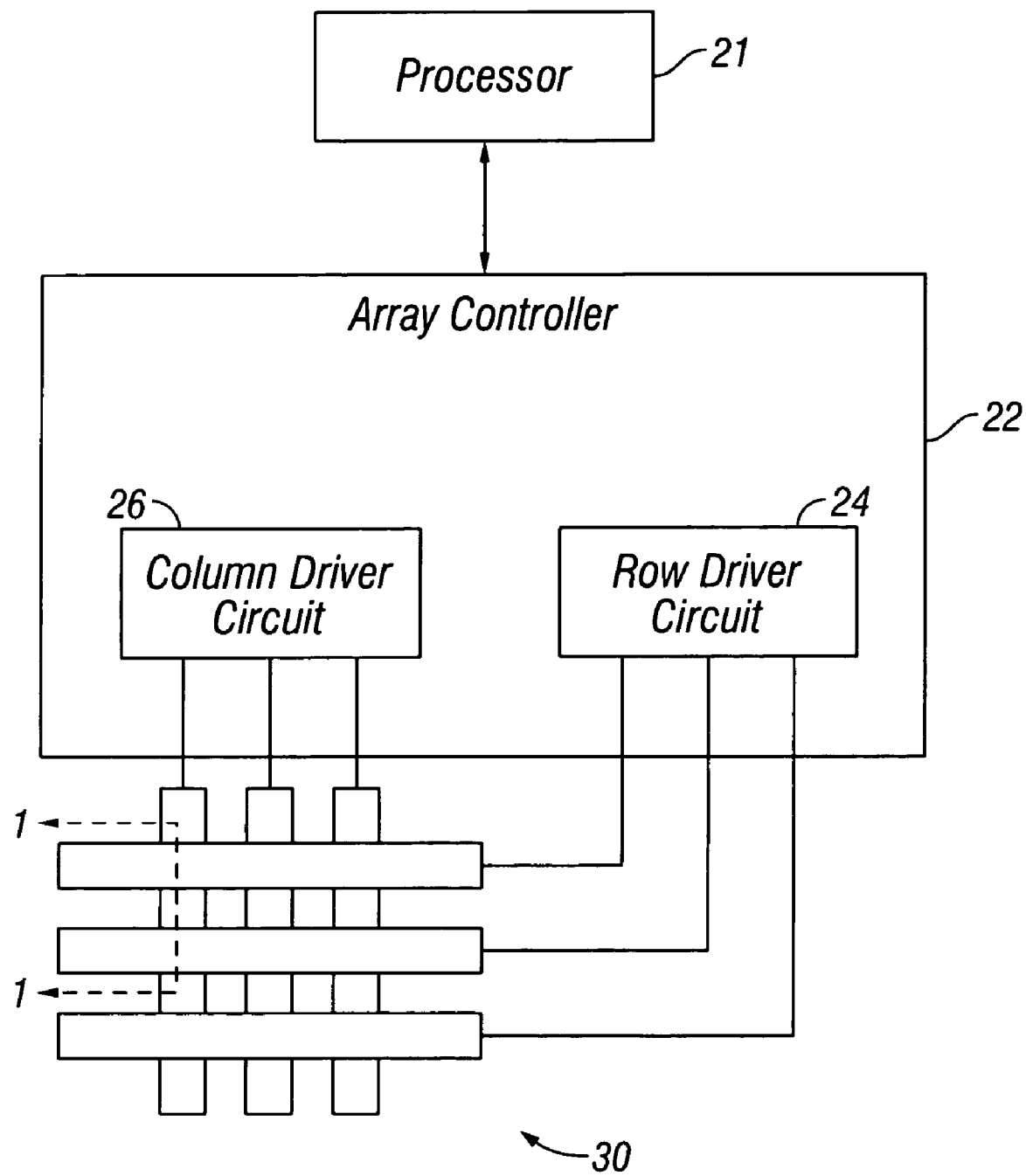
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
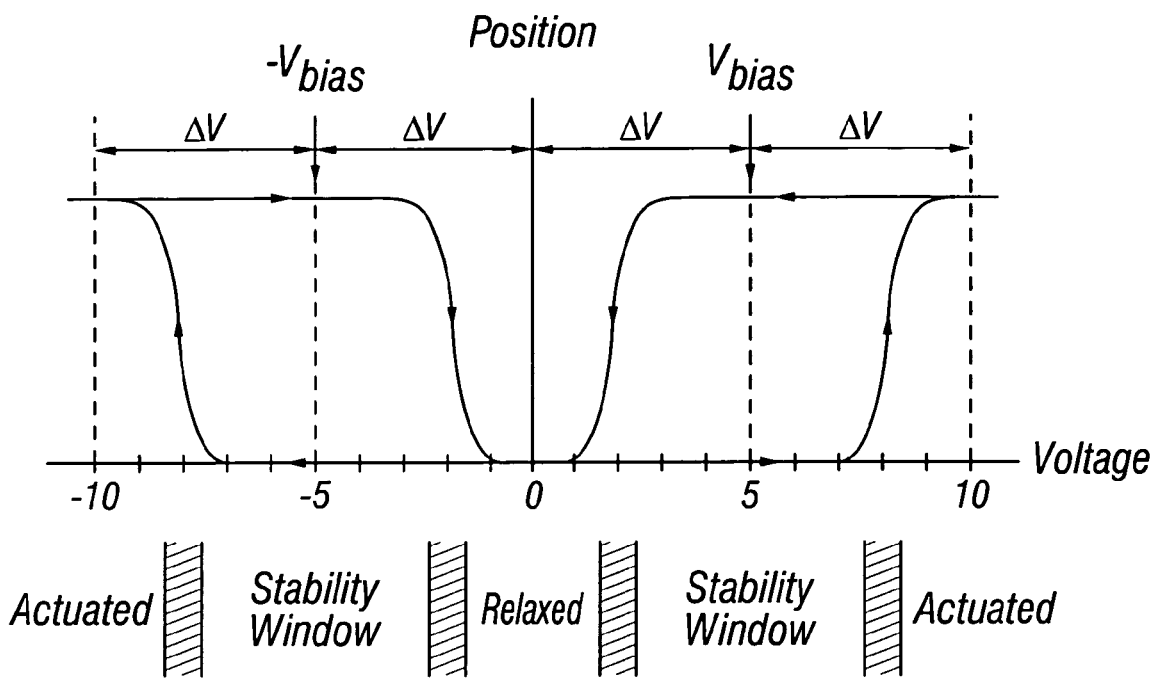
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
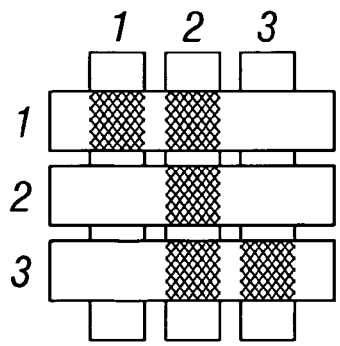
FIGS. 5A and 5B illustrate one exemplary timing diagram for row and column signals that may be used to write a frame of display data to the 3×3 interferometric modulator display of FIG. 2.
Figure 5B:
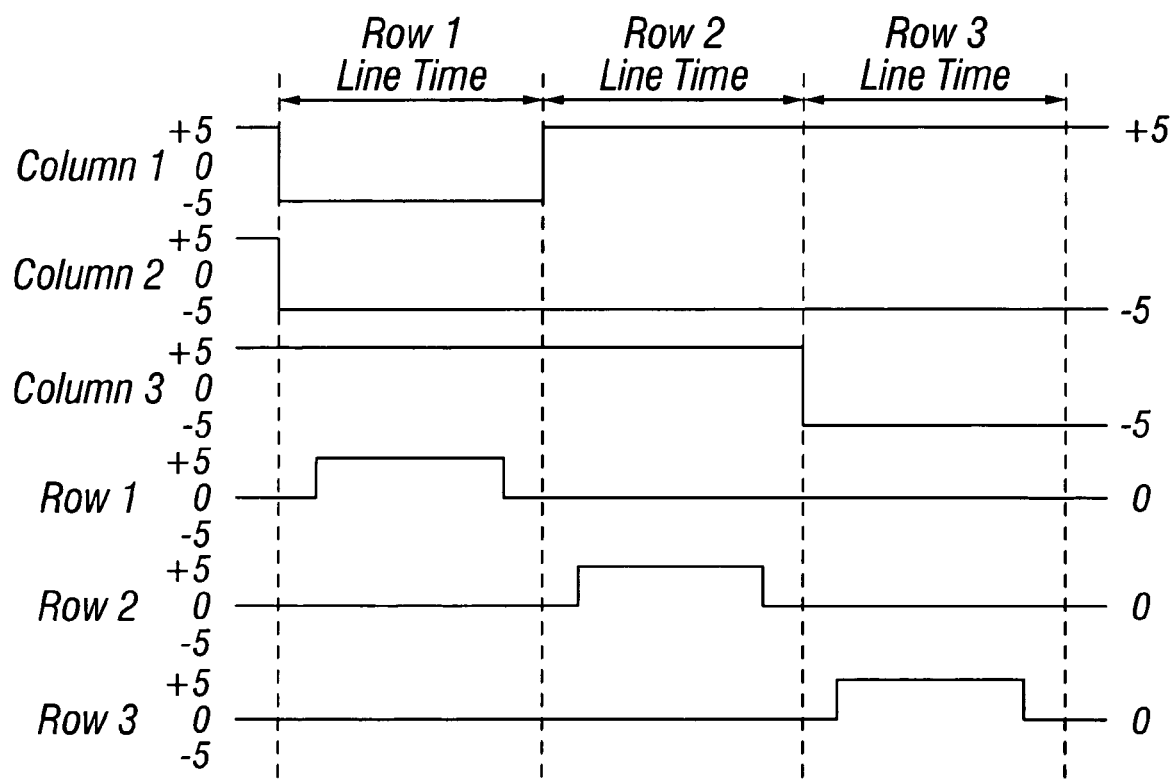

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
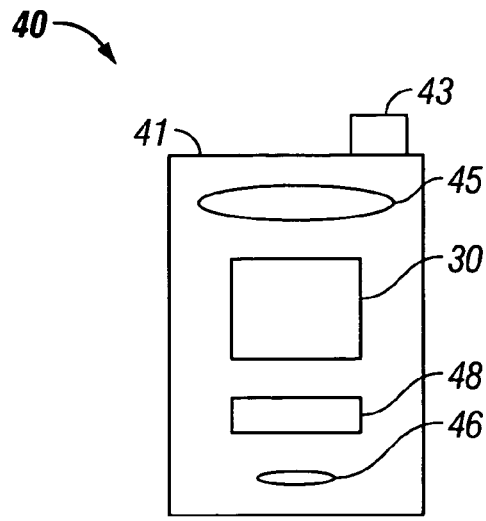
FIGS. 6A and 6B are system block diagrams illustrating an embodiment of a visual display device comprising a plurality of interferometric modulators.
Figure 6B:
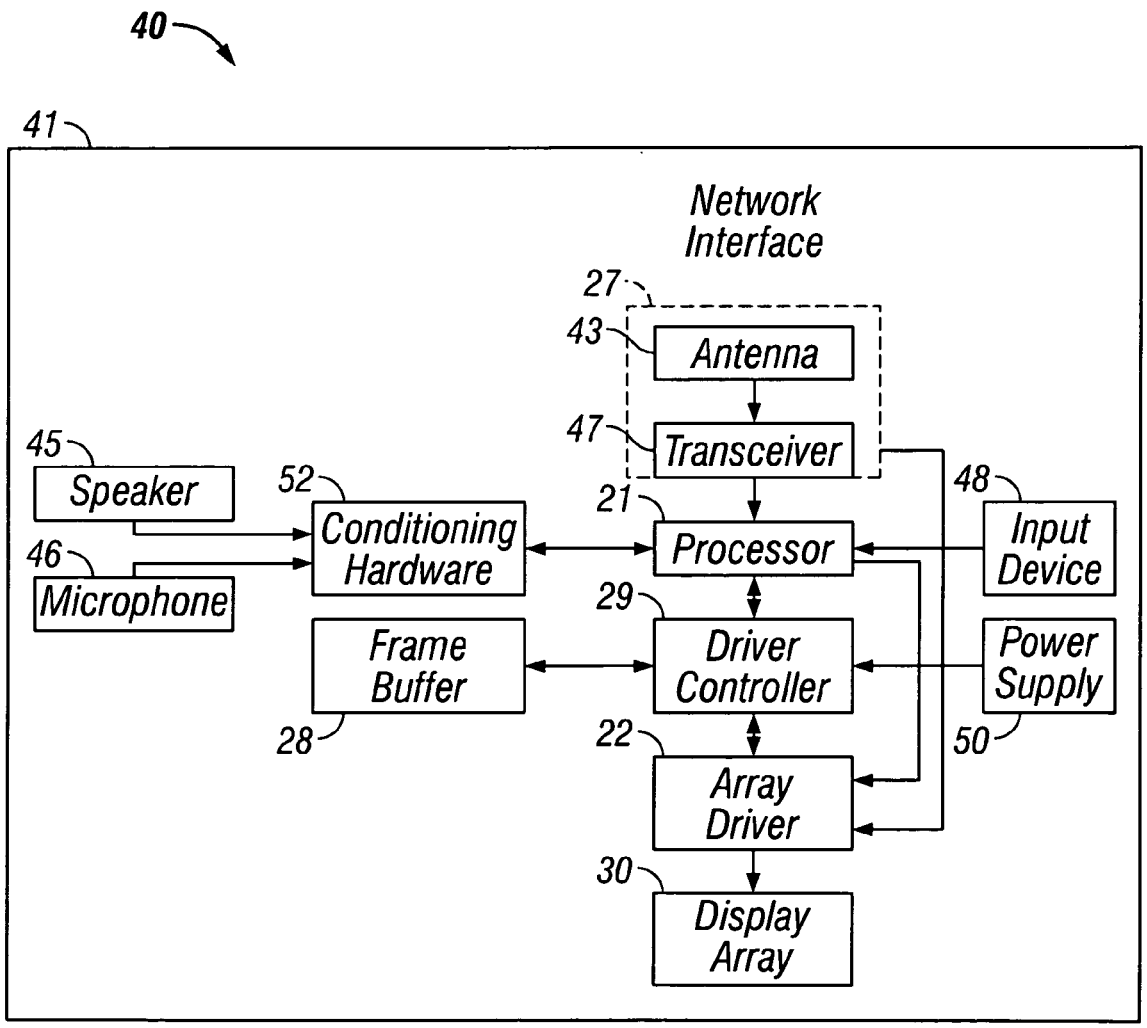

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
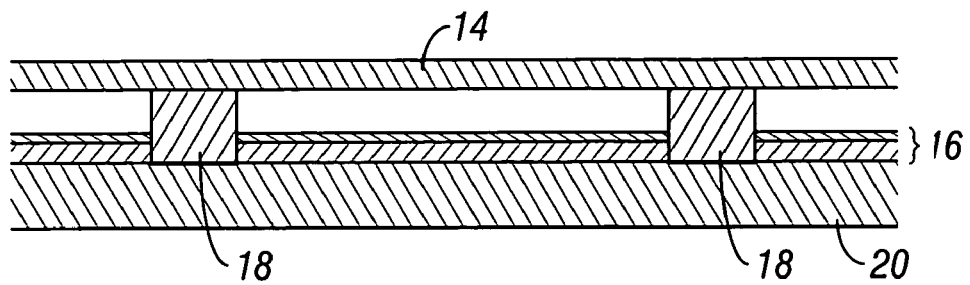
FIG. 7A is a cross section of the device of FIG. 1.
Figure 7B:
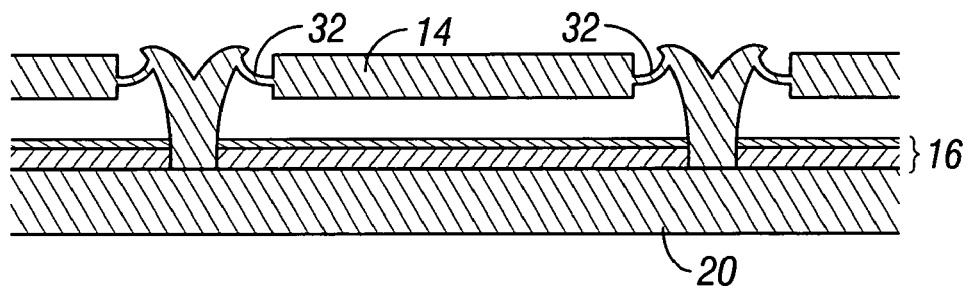
FIG. 7B is a cross section of an alternative embodiment of an interferometric modulator.
Figure 7C:
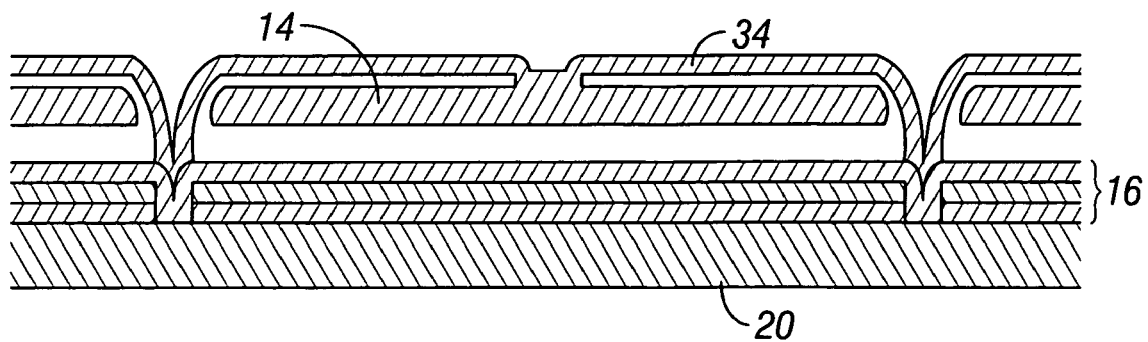
FIG. 7C is a cross section of another alternative embodiment of an interferometric modulator.
Figure 7D:
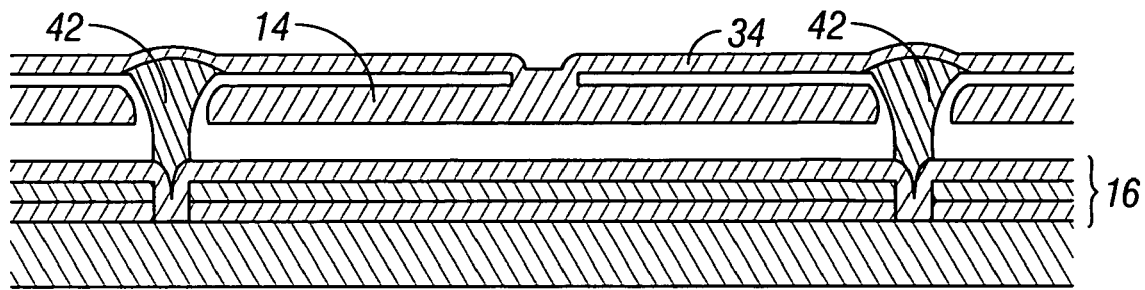
FIG. 7D is a cross section of yet another alternative embodiment of an interferometric modulator.
Figure 7E:
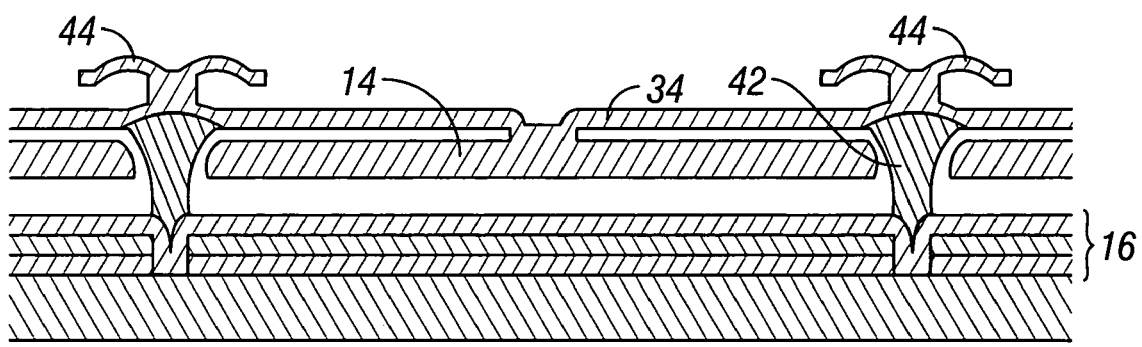
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Measuring Color and Contrast in Specular Reflective Devices

Most display technologies inherently provide diffuse light to the viewer. For example, in emissive displays such as cathode ray tubes, emissive LCDs, and plasma displays, pixels transmit light in multiple directions. Similarly, reflective LCDs scatter incident light in multiple directions. In contrast, specular reflective devices such as interferometric modulator displays without a diffuser film reflect incident light in a specular manner. Accordingly, in one embodiment, color and contrast measurements of a specular reflective device is conducted by measuring light reflected from the device at angles equal to the angle of incident illumination. In one embodiment, the angle of incident illumination is substantially perpendicular to the plane of the specular reflective device. In such an embodiment, the incident illumination and reflected light are substantially parallel. Such a configuration is referred to herein as "in-line" lighting.

Figure 8:
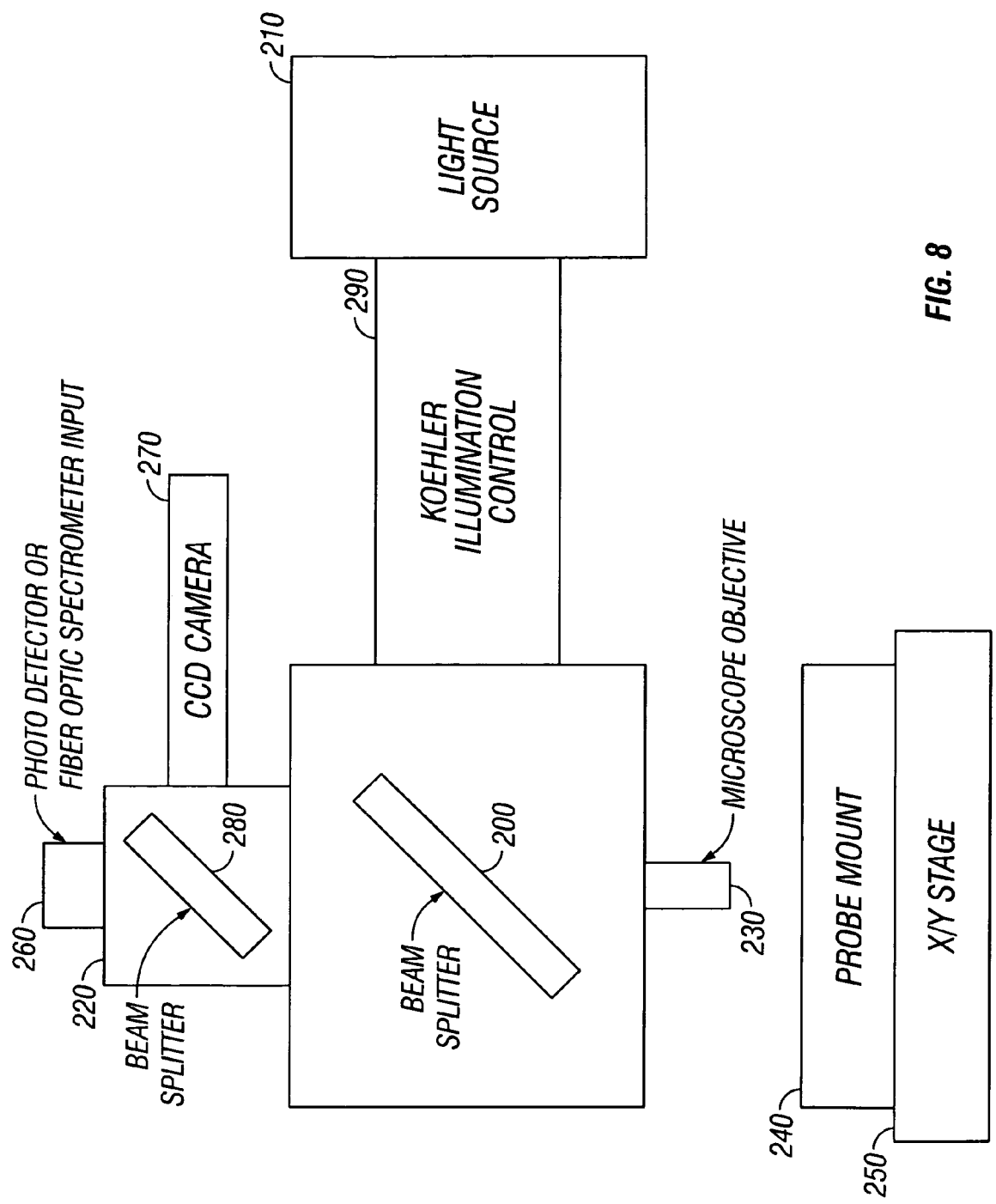
FIG. 8 is block diagram depicting a system for providing in-line illumination and detection for testing of a specular reflective device utilizing beam splitters.

In one embodiment, in-line lighting is accomplished using a system such as displayed in FIG. 8. In this system, a beam splitter 200 is provided that reflects light from a light source 210 onto the device being evaluated. The specular reflective device, such as an interferometric modulator array, may be positioned on a probe mount 240, which may be coupled to an X-Y stage 250. The probe mount 240 may comprise components for making electrical connections to the specular reflective device. For example, probe mount 240 may comprise spring loaded pins that connect with contacts on the specular reflective device. In one embodiment, the specular reflective device is an array of interferometric modulators on a wafer, where the wafer includes electrical contacts for controlling the interferometric modulators on the wafer. The X-Y stage 250 may be used to move the reflective device in order to select a region of the device for illumination and measurement. A detection module 220 is provided for separately detecting light reflected from the device. In this way, both the incident and the detected reflected light is normal to the substrate. In some embodiments, the system may additionally comprise a microscope objective 230 for evaluating only a small portion of the total active surface area of the specular reflective device. In some embodiments, the microscope objective 230 may be focused by measuring the intensity of reflected light by a photodetector 260 in the detection module 220. Optimal focus may be indicated by a maximum in the intensity of the measured reflected light. Those of skill in the art will recognize that lenses may be placed in various locations in the light path from the light source to the probe mount 240 and from the probe mount 240 to the detection module 240 in order to measure light reflected from only a selected region of the specular reflective device.

The detection module 220 may comprise one or more detectors such as a photo detector or spectrometer 260 and a CCD camera 270. One or more beam splitters 280 may be used for simultaneous measurement by more than one detector. The light source 210 may be chosen to provide light having the desirable spectral and intensity characteristics. For example, it may be desirable to have the light source 210 approximate the characteristics of the light source that will typically be used to view the display. In one embodiment, a standard D65 light source is used. In another embodiment, a continuous spectrum light source is used whose spectrum relative to a D65 light source standard is known.

In some embodiments, the light source 210 may be coupled to an illumination control device 290, such as a device having a Koehler design. The aperture of the illumination control device 290 may be adjusted to illuminate only the area of interest on the specular reflective device.

Figure 9:
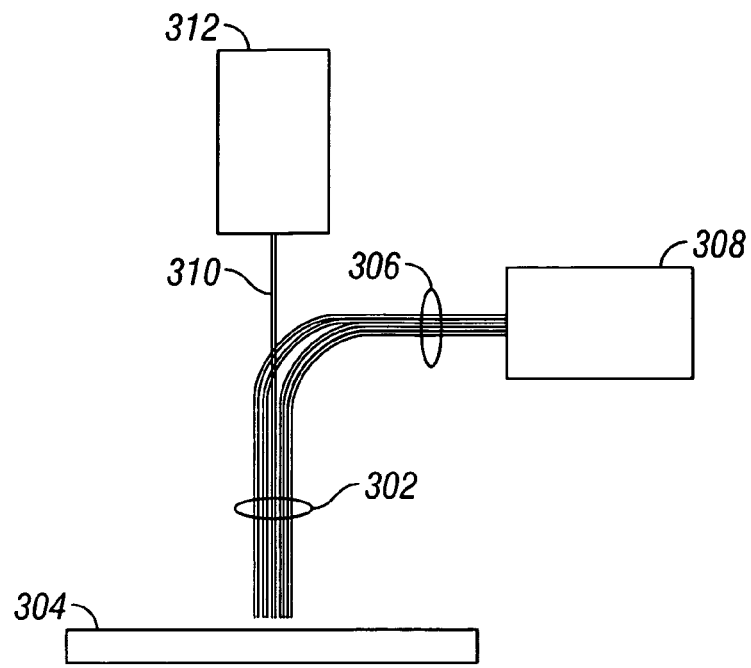
FIG. 9 is a block diagram depicting a system for providing in-line illumination and detection for testing of a specular reflective device utilizing fiber optics.

In another embodiment, in-line lighting may be provided by using a bundle of fiber-optic elements. FIG. 9 depicts a system for providing in-line lighting using fiber optic elements. The system comprises a bundle of optical fibers 302 positioned above the specular reflective device 304 to be measured. One or more fibers 306 in the bundle 302 may be connected to a light source 308. One or more other fibers 310 in the bundle 302 may be connected to a detection module 312. In the embodiment depicted in FIG. 9, the fiber bundle 302 may be positioned normal to the specular reflective device 304. In this configuration, incident light provided through the illumination fibers 306 will be substantially parallel to the light received by the detection fibers 310. In one embodiment, the end of fiber bundle 302 is positioned between about 2 and about 5 μm (e.g., between 3 and 4 μm) from the surface of the specular reflective device 304. In another embodiment, a microscope objective, such is the microscope objective 230 in FIG. 8, may be positioned between the end of the fiber bundle 302 and the surface of the specular reflective device 304.

In one embodiment, the detection module 312 may comprise one or more beam splitters, such as beam splitter 280 depicted in FIG. 8, so that multiple detectors may be used. In an alternative embodiment, the fiber bundle 302 may be positioned such that a beam splitter, such as beam splitter 200 in FIG. 8, directs incident and reflected light normal to the specular reflective device. This configuration allows additional detectors in detection module 220, such as a CCD camera, to be used simultaneously to detect reflected light that is not received by the detection fiber 310.

Figure 10A:
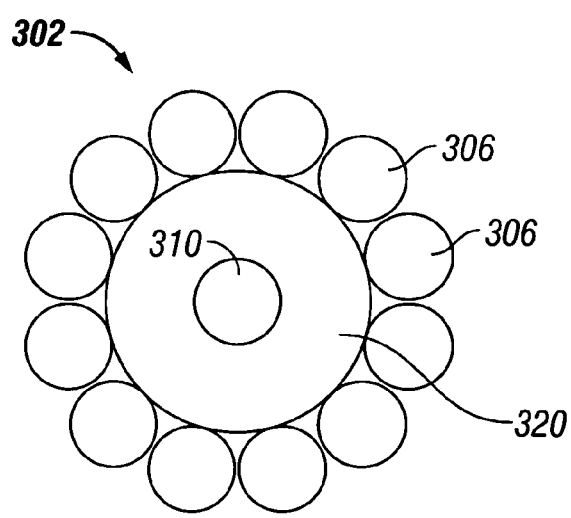
FIG. 10A is a cross-sectional view of one embodiment of the fiber optics depicted in FIG. 9.
Figure 10B:
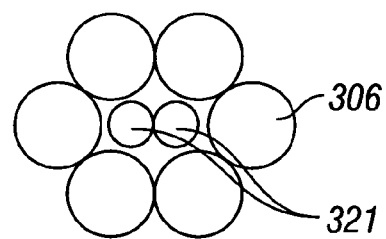
FIG. 10B is a cross-sectional view of another embodiment of the fiber optics depicted in FIG. 9.

FIG. 10A depicts one embodiment of a cross section of the fiber bundle 302. In this embodiment, the illumination fibers 306 are positioned along the periphery of the bundle 302 and the detection fiber 310 is positioned in the center of the bundle 302. This configuration allows for uniform illumination of the portion of the specular reflective device to be detected. In one embodiment, the illumination fibers 306 are spaced apart from the illumination fibers 306 by a spacer 320. In one embodiment, the spacer 320 provides a gap of from about 5 μm to about 5 mm (e.g., between about 20 and about 500 μm) between the detection fiber 310 and the illumination fibers 306. In one embodiment, the fibers 306 and 310 have a diameter of from about 100 μm to about 600 μm (e.g., between about 300 and about 500 μm). In one embodiment, the fibers have a diameter of about 400 μm. In another embodiment, the fibers in the fiber bundle 302 are glued together, such as with an epoxy, and spacer 320 is not used. In another embodiment depicted in FIG. 10B, two detection fibers 321 are positioned in the center of the bundle 302. The two detection fibers 321 may have a smaller diameter than the single detection fiber 310 depicted in FIG. 10A. For example, in one embodiment, the detection fibers 321 each have a diameter of 200 μm.

When measuring light reflected from a specular reflective device (such as an interferometric modulator array) using the in-line lighting systems described above, the size of area of illumination and detection may be controlled using a system of lenses and apertures, such as in the Koehler device 290 with lens 230, or other aperture-lens system. The light may be controlled both before and/or after reflection from the specular reflective device. In one embodiment, the area of illumination of the specular reflective device may be controlled by adjusting the distance between the fiber optics 302 and the device 304. The size of the area used may be any suitable size. In one embodiment when a display is measured, enough pixels are illuminated and detecting so that an averaging effect is achieved over the pixels. In one embodiment, an area having a diameter between about 10 and about 20 pixels is measured. Furthermore, it may be desirable to measure multiple areas over the surface of the display to check for uniformity of response. In one embodiment, only an area at the center of a display is measured. In other embodiments, a number of areas at different positions are measured as recognized in the display industry as an appropriate standard. For example, 5, 9, or 13 different areas may be measured.

Those of skill in the art will appreciate other methods for providing in-line illumination and detection of light reflected from specular reflective devices such as interferometric modulator displays.

Standards for Color and Contrast Measurements

In some embodiments, measurements are made using an in-line lighting system such as described above to make color and contrast determinations in an interferometric modulator display. In some embodiments, the color and contrast determinations are made prior to packaging of an interferometric modulator array into a display device. Thus, if the color and contrast determinations are not satisfactory, the array can be discarded prior to packaging, thereby reducing the costs associated with discarding defective or unsatisfactory displays. Accordingly, in one embodiment, color and contrast measurements of an interferometric modulator display are made at the "wafer" level (i.e., after the array of interferometric modulators are manufactured on the substrate as described above).

In some embodiments, color and contrast measurements may be facilitated by measuring reflection from a dark and bright standard prior to measurements of the interferometric modulator array. In one embodiment, a dark standard is chosen that is representative of the minimum intensity of reflection possible from the interferometric modulators and the bright standard is chosen that is representative of the maximum intensity of reflection possible from the interferometric modulators. In one embodiment, reflection from a dark standard and bright standard is measured prior to each interferometric modulator array tested. In another embodiment, reflection from a single dark standard and bright standard is measured and used as a reference for testing multiple interferometric modulator arrays.

Figure 11:
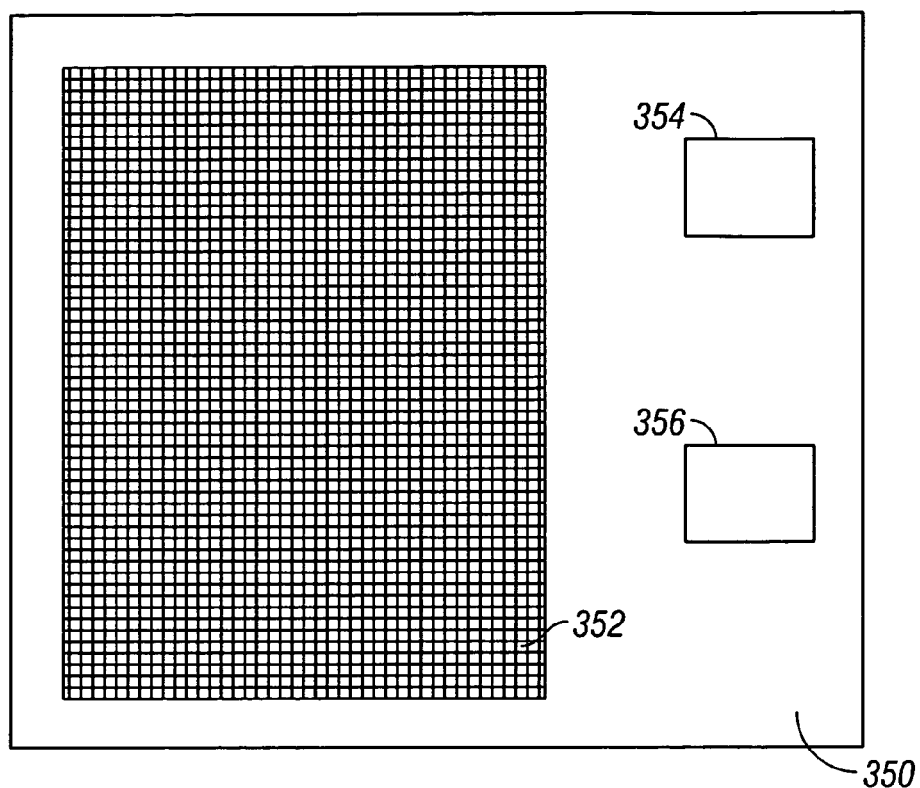
FIG. 11 is a top view of wafer having an integrated interferometric modulator array and bright and dark standards.

In one embodiment, a dark standard and a bright standard is provided on the same wafer as one or more interferometric modulator arrays. FIG. 11 depicts such an embodiment. In FIG. 11, wafer 350 includes interferometric modulator array 352, bright standard 354, and dark standard 356. Prior to making color and/or contrast measurements of interferometric modulator array 352, reflection from the bright standard 354 and the dark standard 356 may be measured and such measurements may be used as comparisons for making the color and/or contrast measurements on the interferometric modulator array 352. After the measurements, the wafer 350 may be cut so as to remove the bright 354 and dark 356 standards and the interferometric modulator array 352 may be incorporated into the desirable device package.

In another embodiment, bright and/or dark standards may be provided as part of the measurement system. For example, in the system depicted in FIG. 8, the standards may be fixed onto the X-Y stage 250. Prior to measurements on each new wafer or between a series of wafers, the X-Y stage 250 may be positioned such that the standards are probed by the system to obtain an accurate calibration. In this way, new standards do not need manufactured on each wafer.

Figure 12A:
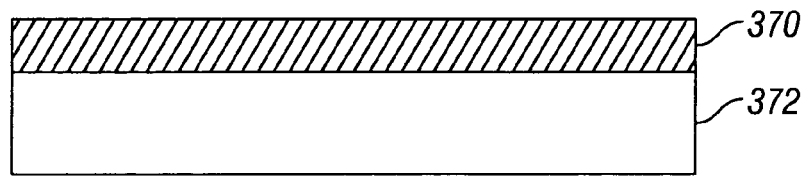
FIG. 12A is a cross section of a bright reflectance standard.

FIG. 12A depicts one embodiment of a bright standard 354. This bright standard 354 comprises a reflective material 370 deposited onto a substantially transparent substrate 372. In one embodiment, reflective material 370 comprises the same material as used to construct the movable mirror in the interferometric modulators, such as depicted as element 14 in FIGS. 1 and 7A through 7C. For example, reflective material 370 may comprise aluminum. In one embodiment, the bright standard 354 depicted in FIGS. 11 and 12A is manufactured on the same wafer 350 as the interferometric modulators 352 at the same time as the interferometric modulators 352. For example, the same deposition and removal steps may be used on the entire wafer 350; however, patterning of bright standard 354 may be such that when the movable mirror is deposited, all other layers in the area of bright standard 354 will have been removed so that the movable mirror material 370 is deposited directly on the substrate 372. The bright standard 354 depicted in FIG. 12A will be representative of a maximum reflectivity from the interferometric modulators 352 because it represents complete reflection from the movable mirrors in the interferometric modulators 352 without any interference due to reflection from the partially reflective layer in the interferometric modulators 352.

Figure 12B:
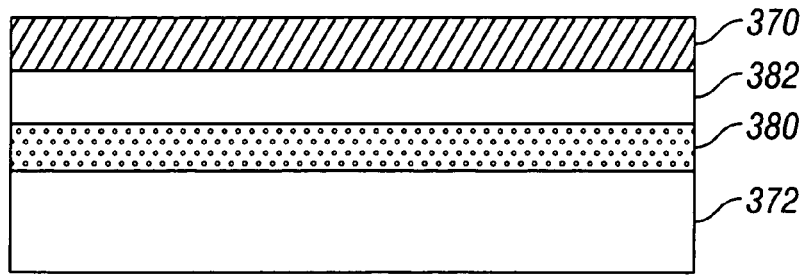
FIG. 12B is a cross section of a dark reflectance standard.

FIG. 12B depicts one embodiment of a dark standard 356. This dark standard 356 comprises a layered structure deposited on a substantially transparent substrate 372. The layered structure includes a partially reflective mirror 380, a substantially transparent dielectric material 382, and a reflective material 370. This structure acts as an etalon because light reflected from the partially reflective mirror 380 will interfere with light reflected multiple times between the partially reflective mirror 380 and the reflective material 370. In one embodiment, the partially reflective mirror 380 comprises the same material as used to construct the partial reflector in the interferometric modulators, such as depicted as element 16 in FIGS. 1 and 7A through 7C. In one embodiment, reflective material 370 comprises the same material as used to construct the movable mirror in the interferometric modulators, such as depicted as element 14 in FIGS. 1 and 7A through 7C. In one embodiment, dielectric 382 comprises the same material as used as a dielectric layer in the interferometric modulators. In one embodiment, the dark standard 356 depicted in FIGS. 11 and 12B is manufactured on the same wafer 350 as the interferometric modulators 352 at the same time as the interferometric modulators 352. For example, the same deposition and removal steps may be used on the entire wafer 350; however, patterning of the dark standard 356 may be such that only the partial reflector 380, dielectric 382, and movable mirror material 370 remains on the substrate. The dark standard 356 depicted in FIG. 12B will be representative of a minimum reflectivity from the interferometric modulators 352 because it is similar in structure to the interferometric modulators 352 in an actuated state (i.e., when the movable mirror layer is forced against the fixed layer as depicted in FIG. 1). In other words, dark standard 356 depicted in FIG. 12B is similar in structure to the interferometric modulators 352 without the presence of an air gap (e.g., air gap 19 in FIG. 1).

In an alternative embodiment, rather than using a dark standard structure 356, the dark reference point may be arbitrarily chosen to be zero reflectivity or the reflectivity measured using the measurement system when the light source is turned off or the lights source may be blocked using an appropriate shutter. Alternatively, a shutter may be used to block light going into the detector.

Those of skill in the art will appreciate other structures or models of reflectivity that may be used as bright and dark reference spectra for making color and contrast determinations of interferometric modulators.

Testing Methodology for Monochrome Displays

In some embodiments, interferometric modulator displays whose color and/or contrast is to be measured will be a monochrome display. Such a display may comprise a plurality of a single type of interferometric modulators capable of existing in one of two states, such as a type depicted in FIGS. 7A through 7C. Each interferometric modulator will have a bright state and a dark state, wherein the bright state will be determined by the interferometric modulator in an unactuated state and the dark state will be determined by the interferometric modulator in an actuated state.

Figure 13:
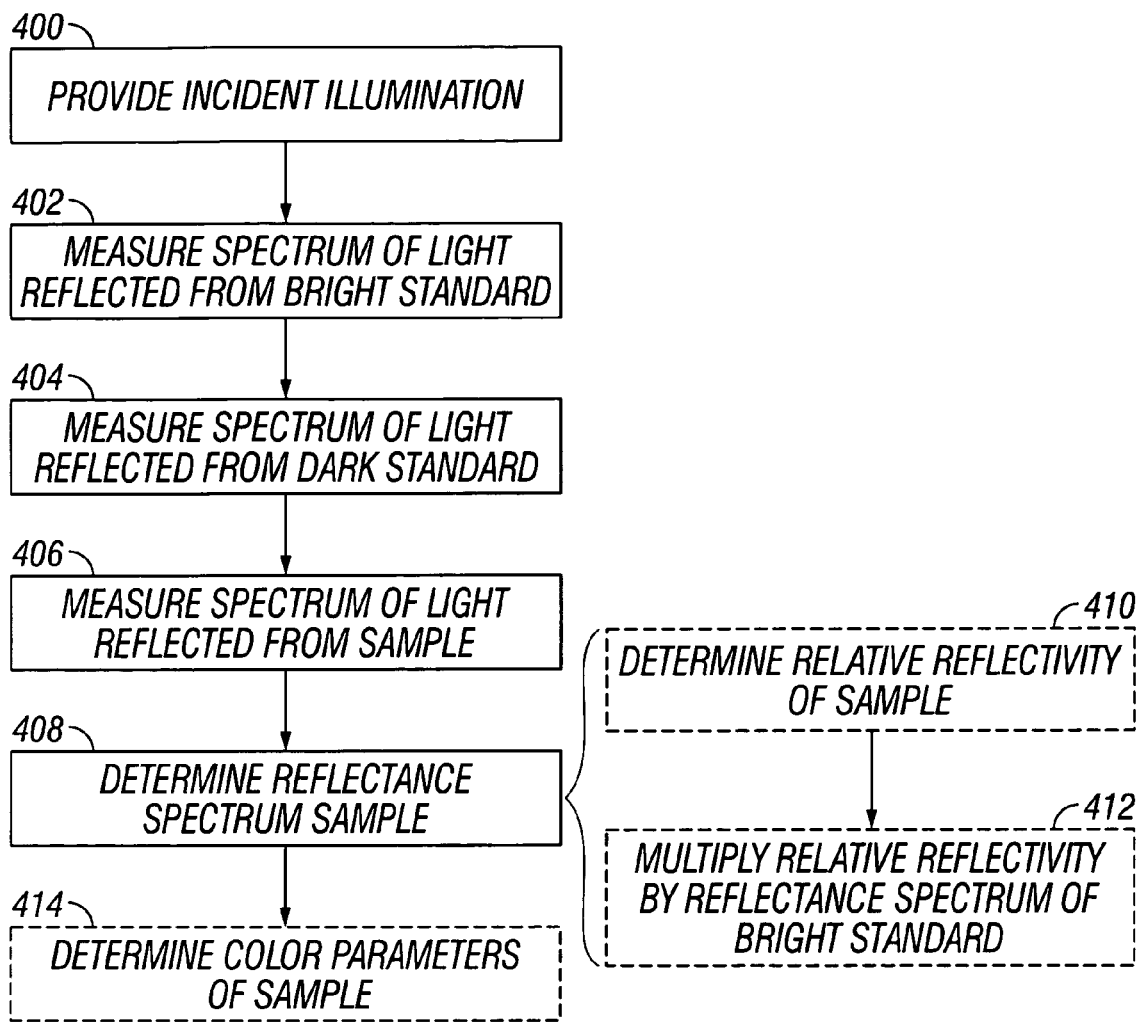
FIG. 13 is a flow chart depicting a method for measuring a reflectance spectrum and color parameters of a specular reflective device.

FIG. 13 is a flowchart depicting one embodiment of a method for measuring color and contrast in an interferometric modulator display. Depending on the particular embodiment, steps may be added to those depicted in FIG. 13 or some steps may be removed. In addition, the order of steps may be rearranged depending on the application. First, at block 400, incident illumination is provided for illuminating standards and the sample interferometric modulator display. The illumination may be provided as part of an in-line illumination system described above. In some embodiments, the illumination is provided to only a portion of the display or standards. Continuing to block 402, the spectrum of light reflected from a bright standard is measured. In one embodiment, the bright standard is a structure as described above. The spectrum may be measured by a spectrometer that is part of an in-line lighting system described above. Moving to block 404, the spectrum of light reflected from a dark standard is measured. In one embodiment, the dark standard is a structure as described above. In some embodiments, the dark reference is obtained by other methods than using a dark standard, such as by turning off or blocking the light source.

Figure 14:
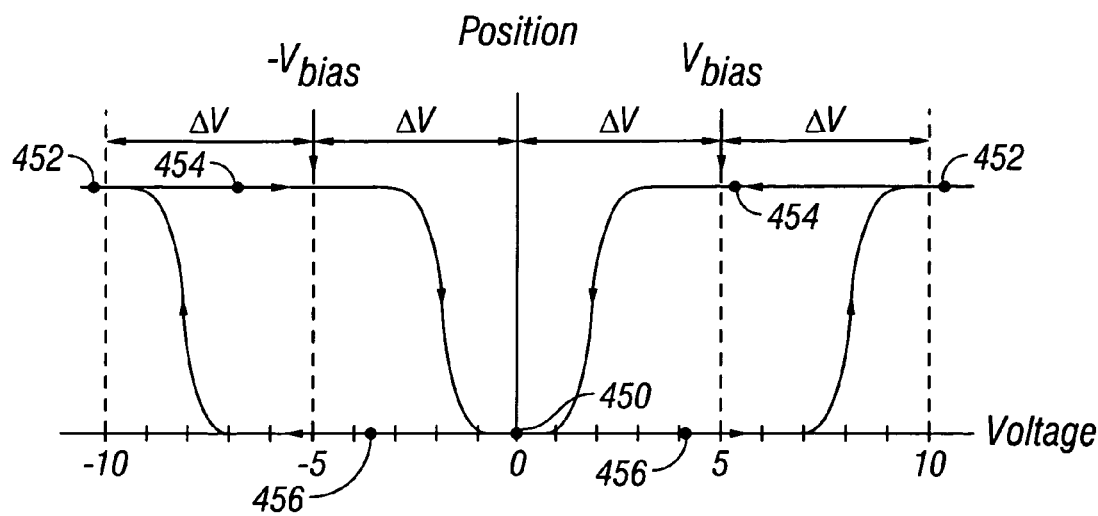
FIG. 14 is a graph depicting the hysteresis characteristics of an interferometric modulator.

Next, at block 406, the spectrum of light reflected from the sample interferometric modulators in the display is measured. The spectrum of incident light may be measured separately for both the interferometric modulators in a bright (unactuated) state and a dark (actuated) state. Furthermore, bright and dark states may be measured under a variety of driving schemes. In one embodiment, spectra of light reflected from the sample interferometric modulators are measured under four different driving schemes. FIG. 14 depicts the hysteresis behavior of interferometric modulators presented previously in FIG. 3. In one driving scheme, no voltage is applied across the interferometric modulators such that the interferometric modulators are undriven. Thus, the interferometric modulators are in an undriven bright state as exemplified in FIG. 14 by point 450. In another driving scheme, a voltage is applied that is high enough to force the interferometric modulators into an actuated dark state regardless of the previous state of the interferometric modulators. Such an overdriven dark state is exemplified by points 452 in FIG. 14. In the third driving scheme, a sequence of voltages is applied to place the interferometric modulators in a dark state within the hysteresis window. Such a memory dark state is exemplified by points 454 in FIG. 14. In the final driving scheme, a sequence of voltages is applied to place the interferometric modulators in a bright state within the hysteresis window. Such a memory bright state is exemplified by points 456 in FIG. 14. Those of skill in the art will recognize that measuring reflectance from the sample interferometric modulators under alternative driving schemes are also possible.

Returning to the flowchart in FIG. 13, at block 408, the reflectance spectrum of the sample interferometric modulators under each desired driving scheme is determined. The reflectance spectrum differs from the measured spectrum of reflected light in that the measured spectrum includes contributions due to the spectrum of the incident light from the light source. For example, one expression of a measured spectrum of reflected light is:

$$I(\lambda)=S(\lambda)R(\lambda)$$

where $I(\lambda)$ is the intensity of reflected light, $S(\lambda)$ is the intensity of light emitted by the illuminating light source, and $R(\lambda)$ is the reflectance spectrum. Thus, the reflectance spectrum represents the inherent spectral properties of the reflective material, independent of the illumination source. In one embodiment, the reflectance spectrum of the sample interferometric modulators is determined based on comparison with standard reflectance spectra determined for the bright and dark standards. In one embodiment, the bright standard includes commercially available high-reflectivity specular reflectance standards for which a calibrated reflectance spectrum has been determined. In one embodiment, this standard is traceable to a NIST master standard. In another embodiment, the reflection spectrum of the bright standard, such as of the bright standards described above that are manufactured simultaneously with the interferometric modulators, may be separately calibrated to a commercially available standard, either each time the standard is measured or once for multiple standards as long as the manufacturing process has not changed in any way. In one embodiment, the dark standard also includes a commercially available dark standard, such as a low-reflectivity specular reflectance standard. Alternatively, the reflectance spectrum of the dark standard is assumed to be zero.

In one embodiment, as depicted in the flowchart of FIG. 13, determining the reflectance spectrum of the sample interferometric modulators comprises determining the relative reflectivity of the sample interferometric modulators compared to the bright and dark standards at block 410 and multiplying the result by the reflectance spectrum of the bright standard at block 412. This method assumes that the reflectivity of the dark standard is zero. The determination may be expressed mathematically as:

$$R(\lambda) = \frac{M(\gamma) - D(\lambda)}{B(\lambda) - D(\lambda)} R_B(\lambda)$$

where $R(\lambda)$ is the reflectance spectrum of the sample interferometric modulators, $M(\lambda)$ is the measured intensity of light reflected form the sample interferometric modulators, $D(\lambda)$ is the measured intensity of light reflected from the dark standard, $B(\lambda)$ is the measured intensity of light reflected from the bright standard, and $R_B(\lambda)$ is the reflectance spectrum of the bright standard. In an alternative embodiment, the reflectance spectrum of the sample is also corrected based on the reflectivity of the dark standard. In this embodiment, the reflectivity of the dark standard is not assumed to be zero.

Figure 15:
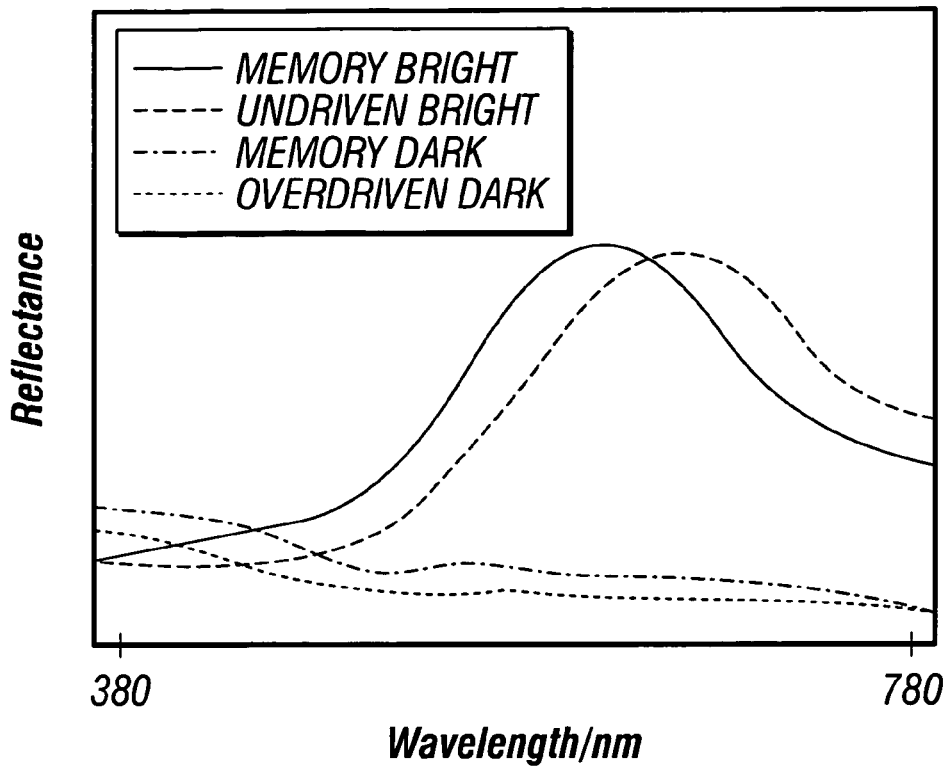
FIG. 15 is a graph depicting reflectance spectra of interferometric modulators under various driving schemes.

FIG. 15 is a graph depicting typical reflectance spectra determined for an interferometric modulator under the four driving schemes discussed above. These reflectance spectra can be used to determine whether the tested interferometric modulators are suitable for use in a display or whether there were any problems during manufacturing. Ideally, the bright states will indicate reflectance spectra with large peaks within the visible spectrum and the dark states will indicate low reflectivity in the visible spectrum. Furthermore, comparison of the two bright states with each other and the two dark states with each other can provide information regarding the sample interferometric modulators. The memory bright reflectance spectrum is shifted to shorter wavelengths relative to the undriven reflectance spectrum. This result is because a voltage is applied across the interferometric modulators in the memory bright state, causing the movable mirror to bow towards the partial reflector. Ideally, the reflectance spectrum of the memory bright state will not be shifted too far relative to the undriven state. If the shifting is significant, there could be an indication that the movable mirror is too flexible and the bright states of the display will not provide consistent color and reflectivity. Similarly, the memory dark and overdriven states will ideally have similar reflectance spectra. If the reflectance spectra are significantly different, there could be an indication that the movable mirror still moves significantly when the higher voltages of the overdriven state are applied. This result could indicate that the movable mirror is not flexible enough, resulting in inconsistent dark states. It will be appreciated that the reflectance spectra in FIG. 15 can also provide indications regarding problems in the manufacturing process.

Returning again to FIG. 13, in one embodiment, the reflectance spectra for the sample interferometric modulators may optionally be converted to color parameters such as CIE standard tri-stimulus values at block 414. In one embodiment, CIE tri-stimulus values X, Y, and Z are determined using the following relations:

$$X = \frac{\int_{380}^{780} S(\lambda)\bar{x}(\lambda)R(\lambda)d\lambda}{\int_{380}^{780} S(\lambda)\bar{y}(\lambda)d\lambda}$$

$$Y = \frac{\int_{380}^{780} S(\lambda)\bar{y}(\lambda)R(\lambda)d\lambda}{\int_{380}^{780} S(\lambda)\bar{y}(\lambda)d\lambda}$$

$$Z = \frac{\int_{380}^{780} S(\lambda)\bar{z}(\lambda)R(\lambda)d\lambda}{\int_{380}^{780} S(\lambda)\bar{y}(\lambda)d\lambda}$$

where $S(\lambda)$ is the spectral intensity of the light source, $R(\lambda)$ is the reflectance spectrum, and $\bar{x}(\lambda)$, $\bar{y}(\lambda)$, and $\bar{z}(\lambda)$ are the CIE color matching functions. In some embodiments, the tri-stimulus values are converted to Y, x, y or Y, u', v' equivalents where conversion is as follows:

$$x = \frac{X}{X+Y+Z};$$

$$y = \frac{Y}{X+Y+Z};$$

$$z = \frac{Z}{X+Y+Z} = 1 - x - y;$$

$$u' = \frac{4X}{X+15Y+3Z};$$

$$v' = \frac{9Y}{X+15Y+3Z}.$$

CIE tri-stimulus values and the color matching functions are well known in the art. Color parameters may be determined for a sample interferometric modulator undergoing each of the driving schemes discussed above. For example, Table 1 lists color parameters for one particular interferometric modulator obtained for the four driving schemes.

TABLE 1

Color parameters of interferometric modulator.

| Color Parameter | Undriven Bright | Memory Bright | Memory Dark | Overdriven Dark |
|---|---|---|---|---|
| x | 0.44 | 0.42 | 0.29 | 0.29 |
| y | 0.38 | 0.40 | 0.30 | 0.30 |
| z | 0.18 | 0.18 | 0.42 | 0.41 |
| u' | 0.27 | 0.27 | 0.19 | 0.20 |
| v' | 0.51 | 0.52 | 0.45 | 0.45 |
| Y | 0.33 | 0.44 | 0.13 | 0.11 |

The Y color parameter is perceived by a human viewer as indicative of the brightness of a color. Accordingly, in some embodiments, the contrast of an interferometric modulator display may be defined as the ratio of the Y color parameter in the memory bright state to the Y color parameter in the memory dark state. For example, the contrast ratio of the interferometric modulators having the color parameters of Table 1 would be 3.5.

The values for the color parameters may be used to determine whether the sample interferometric modulators are suitable for use in a display. For example, the color parameter values may be compared to values desirable for a particular display application.

Testing Methodology for Polychrome Displays

In some embodiments, a polychromatic interferometric modulator array is tested. For example, a color interferometric modulator display may be constructed by providing pixels that contain interferometric modulators of three different types, each type characterized by a different sized air gap (e.g., air gap 19 in FIG. 1). The bright state of each type of interferometric modulator will thus reflect light having different colors. Alternatively, a polychromatic interferometric modulator display may be constructed by manufacturing interferometric modulators whose air gap can be adjusted to intermediate states by applying various voltages. Thus, such an interferometric modulator may have several bright states, each reflecting different colors.

For polychromatic displays, the reflectance spectrum of each different combination of colored bright states may be determined as described above for monochromatic displays and depicted in FIG. 13. The dark state of such a display may be determined by all pixels being in a dark state. Additionally, for polychromatic displays consisting of three primary-color bright states, a white bright state reflectance spectrum may be measured by measuring the simultaneous bright states of all the colors. Thus, in one example, for an interferometric modulator display having red, green, and blue subpixels, eight reflectance spectra are measured as indicated in Table 2.

TABLE 2

Reflectance spectra measured in a color interferometric modulator display.

| Reflectance spectrum | Red subpixels | Green subpixels | Blue subpixels |
|---|---|---|---|
| Red | Bright | Dark | Dark |
| Green | Dark | Bright | Dark |
| Blue | Dark | Dark | Bright |
| Cyan | Dark | Bright | Bright |
| Yellow | Bright | Bright | Dark |
| Magenta | Bright | Dark | Bright |
| Black | Dark | Dark | Dark |
| White | Bright | Bright | Bright |

Additionally, each bright and dark states may be either memory bright and dark states, un-driven bright states, over-driven dark states, or any combination thereof Accordingly, a large number of possible reflectance spectra may be determined for polychromatic displays.

The non-primary colors produced by combinations of bright states (e.g., cyan, yellow, and magenta) are useful for indicating whether the dark state of a particular color interferometric modulator is satisfactory. For example, if the red subpixel is not dark enough, the determined reflectance spectrum for cyan will differ from what is expected.

Figure 16:
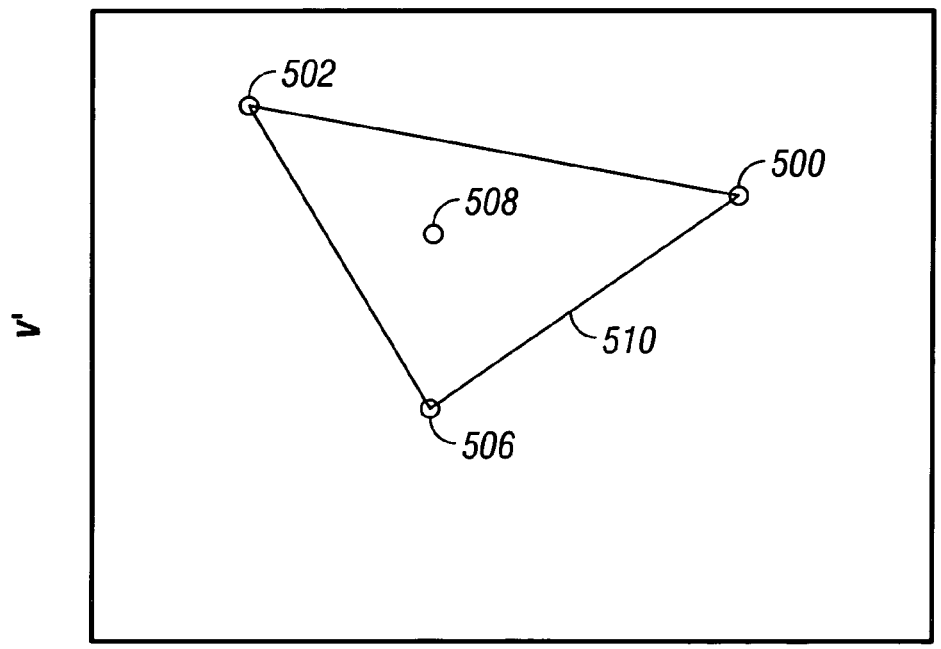
FIG. 16 is a color space plot depicting color parameters for a three-color interferometric modulator display.

In some embodiments, color parameters as described above may be determined for each reflectance spectrum measured. In such a case, it may be desirable to plot the color parameters in a color space plot. FIG. 16 depicts one such color space plot where the color parameters for red 500, green 502, blue 506, and white 508 reflectance spectra have been determined and plotted. The area depicted by triangle 510 provides an indication of the color gamut available to the display. Accordingly, such a representation can be used in designing a display with desired color gamut characteristics and white point. Furthermore, the multiple color parameters may be used for determining whether the sample interferometric modulators are suitable for use in a display. For example, it may be desirable that a particular display application have a specified color gamut. The color parameter determination described above can be used to determine whether the specified color gamut has been achieved by the sample interferometric modulators.

The contrast ratio for polychromatic displays may be determined as a ratio of the Y color parameters for the white and black states. Alternatively, contrast ratios may be determined independently for each color subpixel. For example, the ratio of the Y color parameter for the red reflectance spectrum in Table 2 to the Y color parameter of the black reflectance spectrum provides a red contrast ratio.

While all of the measurements in a polychromatic display described above can be made using a single bright standard, in some embodiments, multiple bright standards are used that each have maximum reflectivity at wavelengths closer that the maximum observed for each color subpixel.

Although the invention has been described with reference to embodiments and examples, it should be understood that numerous and various modifications can be made without departing from the spirit of the invention. Accordingly, the invention is limited only by the following claims.

What is claimed is:

1. A method of measuring color or contrast of one or more sample interferometric modulators, comprising:
   measuring a spectrum of light reflected from a bright standard located on a substrate;
   measuring a spectrum of light reflected from the one or more sample interferometric modulators also located on the substrate; and
   determining a reflectance spectrum of the sample interferometric modulators based on the spectra of light reflected from the bright standard and one or more sample interferometric modulators.

2. A method of measuring color or contrast of one or more sample interferometric modulators, comprising:
   measuring a spectrum of light reflected from a bright standard;
   measuring a spectrum of light reflected from the one or more sample interferometric modulators;
   measuring a spectrum of light reflected from a dark standard; and
   determining a reflectance spectrum of the sample interferometric modulators based on the spectra of light reflected from the bright standard and one or more sample interferometric modulators.

3. The method of claim 2, wherein the dark standard includes at least one etalon.

4. The method of claim 1, wherein the light reflected from the bright standard and sample interferometric modulators includes light from an illumination source that is specularly reflected from the bright standard and sample interferometric modulators.

5. The method of claim 4, wherein light reflected from the bright standard and sample interferometric modulators includes light reflected substantially perpendicular to reflective surfaces of the standards and sample interferometric modulators.

6. The method of claim 1, wherein the spectrum of light reflected from the one or more sample interferometric modulators is measured for both the sample interferometric modulators in a bright state and the sample interferometric modulators in a dark state.

7. The method of claim 1, wherein the spectrum of light reflected from the one or more sample interferometric modulators is measured for the sample interferometric modulators in an undriven state, an overdriven state, a memory dark state, and a memory bright state.

8. The method of claim 1, wherein the sample interferometric modulators includes a first set of interferometric modulators adapted to reflect light of a first color and a second set of interferometric modulators adapted to reflect light of a second color, wherein the first color is different from the second color, wherein the spectrum of light reflected from the one or more sample interferometric modulators is measured separately for the first set of interferometric modulators and the second set of interferometric modulators.

9. The method of claim 1, wherein the bright standard includes a specular reflective standard.

10. The method of claim 2, wherein determining a reflectance spectrum of the sample interferometric modulators includes determining relative spectral reflectivity of the sample interferometric modulators compared to spectral reflectivity of the bright and dark standards.

11. The method of claim 10, wherein determining a reflectance spectrum of the sample interferometric modulators includes multiplying the relative spectral reflectivity by the spectral reflectivity of the bright standard.

12. The method of claim 1, further comprising determining color parameters from the reflectance spectrum.

13. The method of claim 12, further comprising determining contrast of the sample interferometric modulators by comparing a color parameter determined for the sample interferometric modulators in a bright state with a color parameter determined for the sample interferometric modulators in a dark state.

14. An integrated reflective display element and test standard wafer, comprising: a plurality of reflective display elements adapted for use in a display, wherein the reflective display elements are interferometric modulators; and a bright standard, wherein the reflective display elements and the bright standard are present on a single wafer.

15. The wafer of claim 14, further comprising a dark standard, wherein the reflective display elements, the bright standard, and the dark standard are present on a single wafer.

16. The wafer of claim 14, wherein the bright standard comprises a reflective material deposited on a transparent substrate.

17. The wafer of claim 15, wherein the dark standard comprises at least one etalon.

18. A wafer, comprising: a plurality of first means for reflecting light for use in a display, wherein the first means comprises interferometric modulators; and second means for reflecting light at an intensity greater than light reflected from the first means, wherein the first means and the second means are present on a single wafer.

19. The wafer of claim 18, wherein the second means comprises a bright standard.

20. An in-line lighting and measurement system, comprising:
   an illumination source adapted to illuminate a specularly reflective device;
   a detector adapted to detect light reflected from the specularly reflective device;
   a specularly reflective bright standard adapted to specularly reflect light from the illumination source into the detector, thereby providing a reflectance spectrum standard for use in determining a reflectance spectrum of the specularly reflective device; and a specularly reflective dark standard comprising an etalon adapted to specularly reflect light from the illumination source into the detector, thereby providing a second reflectance spectrum standard for use in determining the reflectance spectrum of the specularly reflective device.

21. The system of claim 20, further comprising a shutter adapted to block light from the illumination source from reaching the detector.

22. The system of claim 20, wherein the detector comprises a spectrometer.

23. A method of determining whether an array of interferometric modulators are suitable for use in a display, comprising:

determining color parameters for at least some of the interferometric modulators in an un-driven state, a memory dark state, a memory bright state, and an over-driven state; and identifying the array as suitable for use as a display based on said determining.

24. The method of claim 23, wherein the array includes a first set of interferometric modulators adapted to reflect light of a first color and a second set of interferometric modulators adapted to reflect light of a second color, wherein the first color is different from the second color, wherein color parameters are determined for both the first set of interferometric modulators and the second set of interferometric modulators.

25. The method of claim 24, wherein said identifying is based on a color gamut indicated by the color parameters.

26. The method of claim 23, wherein said identifying is based on a contrast ratio determined as a ratio of one of the color parameters measured in two different states.

27. An integrated interferometric modulator and test standard wafer manufactured by a process that comprises:

a plurality of material deposition steps;

a plurality of patterning steps that define regions for material removal; and a plurality of material removal steps, wherein the patterning steps are used to define a plurality of interferometric modulators and separately at least one reflectivity standard selected from the group consisting of a bright standard and a dark standard.

28. The wafer of claim 27, wherein the at least one reflectivity standard includes a region of the wafer where all but one or more high reflectivity materials have been removed.

29. The wafer of claim 27, wherein the at least one reflectivity standard includes a region of the wafer where a static etalon is formed.

30. A method of manufacturing an interferometric modulator array, comprising:

forming a plurality of interferometric modulators on a substantially transparent substrate;

forming a reflectivity standard on the substrate, wherein the reflectivity standard is selected from the group consisting of a bright standard and a dark standard.

31. The method of claim 30, wherein the reflectivity standard and interferometric modulators are both formed by an identical series of material deposition and removal steps, wherein the interferometric modulators and reflectivity standard are exposed to different patterning.

32. A method of measuring color of an interferometric modulator on a substrate, comprising:

detecting light reflected from the interferometric modulator, determining a first reference reflectivity using a means for reflecting a maximum amount of light also on the substrate; and determining the color of the interferometric modulator from the detected light and first reference reflectivity.

33. A method of measuring color of an interferometric modulator, comprising:

detecting light reflected from the interferometric modulator;

determining a first reference reflectivity using a means for reflecting a maximum amount of light;

determining a second reference reflectivity using a means for reflecting a minimum amount of light;

determining the color of the interferometric modulator from the detected light and the first and second reference reflectivities.

34. The method of claim 32, wherein the step of determining the color includes determining a reflectance spectrum of the interferometric modulator.

35. The method of claim 32, wherein the step of determining the color includes determining one or more color parameters of the interferometric modulator.

36. An interferometric modulator display comprising a plurality of interferometric modulators identified as suitable for use in the display by:

detecting light reflected from at least some of the interferometric modulators, wherein the interferometric modulators are located on a substrate;

detecting light reflected from a bright standard also located on the substrate; and determining a reflectance spectrum, one or more color parameters, and/or a contrast ratio of the interferometric modulators.

37. An interferometric modulator display comprising a plurality of interferometric modulators identified as suitable for use in the display by:

detecting light reflected from at least some of the interferometric modulators;

detecting light reflected from a dark standard; and determining a reflectance spectrum, one or more color parameters, and/or a contrast ratio of the interferometric modulators.

38. The display of claim 37, wherein the dark standard includes at least one etalon.

39. The display of claim 36, further comprising:

a processor that is in electrical communication with said display, said processor being configured to process image data; and a memory device in electrical communication with said processor.

40. The display as recited in claim 39, further comprising:

a first controller configured to send at least one signal to said display; and a second controller configured to send at least a portion of said image data to said first controller.

41. The display as recited in claim 39, further comprising an image source module configured to send said image data to said processor.

42. The display as recited in claim 41, wherein said image source module comprises at least one of a receiver, transceiver, and transmitter.

43. The display as recited in claim 39, further comprising an input device configured to receive input data and to communicate said input data to said processor.

* * * * *